United States Patent
Barnes et al.

(10) Patent No.: US 7,837,951 B2
(45) Date of Patent: Nov. 23, 2010

(54) MODULAR OZONE GENERATOR WITH AN AIR DIFFUSER

(75) Inventors: Steven R. Barnes, Phoenix, AZ (US); Richard D. Conn, Tempe, AZ (US); Robert J. Gray, III, Tempe, AZ (US)

(73) Assignee: GSG Holdings, Inc., Chandler, AZ (US)

( * ) Notice: Subject to any disclaimer, the term of this patent is extended or adjusted under 35 U.S.C. 154(b) by 1188 days.

(21) Appl. No.: 11/331,757

(22) Filed: Jan. 13, 2006

(65) Prior Publication Data
US 2006/0144691 A1 Jul. 6, 2006

Related U.S. Application Data

(63) Continuation-in-part of application No. 11/029,288, filed on Jan. 5, 2005.

(51) Int. Cl.
*B01J 19/08* (2006.01)
(52) U.S. Cl. ............................. 422/186.04; 415/224.5; 239/343; 96/64
(58) Field of Classification Search ............ 422/186.04; 415/224.5; 239/343; 96/64
See application file for complete search history.

(56) References Cited

U.S. PATENT DOCUMENTS

| | | | |
|---|---|---|---|
| 1,437,760 A | 12/1922 | Kuhlenschmidt | |
| 1,531,196 A | 3/1925 | Kuhlenschmidt | |
| 2,970,821 A | 2/1961 | Axt | 261/16 |
| 3,336,099 A | 8/1967 | Czulak et al. | 21/102 |
| 3,550,782 A | 12/1970 | Veloz | 210/192 |
| 3,696,932 A | 10/1972 | Rosenberg | 210/437 |
| 3,726,404 A | 4/1973 | Troglione | 210/139 |
| 3,842,982 A | 10/1974 | Joyce | |
| 4,069,153 A | 1/1978 | Gunther | 210/64 |
| 4,101,783 A | 7/1978 | Hutter | |
| 4,141,830 A | 2/1979 | Last | 210/63 Z |
| 4,176,061 A | 11/1979 | Stopka | 210/63 Z |
| 4,179,616 A | 12/1979 | Coviello et al. | 250/527 |
| 4,230,571 A | 10/1980 | Dadd | 210/760 |
| 4,273,660 A | 6/1981 | Beitzel | 210/760 |
| 4,274,970 A | 6/1981 | Beitzel | 210/748 |
| 4,323,810 A | 4/1982 | Horstmann | 313/24 |
| 4,412,716 A | 11/1983 | Baba et al. | |
| 4,417,966 A | 11/1983 | Krauss et al. | 204/176 |

(Continued)

FOREIGN PATENT DOCUMENTS

DE 38 28 026 8/1988

(Continued)

*Primary Examiner*—Alexa D Neckel
*Assistant Examiner*—Xiuyu Tai
(74) *Attorney, Agent, or Firm*—Booth Udall, PLC

(57) ABSTRACT

An ozone generator for providing ozone enriched air that comprises a body for defining a chamber for air flow therethrough and an ultraviolet lamp disposed in said chamber for irradiating the air passing through said chamber to convert oxygen molecules to ozone molecules. The device further comprises an air inlet for introducing air and a diffuser for diffusing the introduced air about said lamp. The diffuser has an annular flange with a plurality of apertures therein, said annular flange extending inwardly from a cylindrical portion encircling the annular flange, the cylindrical portion abutting and extending from the annular wall. The device further comprises an air outlet for discharging ozone enriched air.

22 Claims, 5 Drawing Sheets

U.S. PATENT DOCUMENTS

| | | | | |
|---|---|---|---|---|
| 4,422,450 | A | 12/1983 | Rusteberg | 128/60 |
| 4,437,999 | A | 3/1984 | Mayne | 210/748 |
| 4,476,773 | A * | 10/1984 | Fehr | 454/121 |
| 4,504,445 | A | 3/1985 | Walz | 422/186.15 |
| 4,676,896 | A | 6/1987 | Norton | 210/192 |
| 4,694,179 | A | 9/1987 | Lew et al. | 250/431 |
| 4,744,877 | A | 5/1988 | Maddock | 204/266 |
| 4,752,401 | A | 6/1988 | Bodenstein | 210/746 |
| 4,857,204 | A | 8/1989 | Joklik | 210/695 |
| 4,857,277 | A | 8/1989 | Broomfield | 422/186.07 |
| 4,913,827 | A | 4/1990 | Nebel | 210/748 |
| 4,968,437 | A | 11/1990 | Noll et al. | 210/748 |
| 4,990,311 | A * | 2/1991 | Hirai et al. | 422/4 |
| 5,029,252 | A | 7/1991 | Ameseder | 250/455.1 |
| 5,082,558 | A | 1/1992 | Burris | 210/167 |
| 5,106,495 | A | 4/1992 | Hughes | 210/139 |
| 5,120,450 | A | 6/1992 | Stanley, Jr. | 210/748 |
| 5,141,636 | A | 8/1992 | Flanagan et al. | 210/209 |
| 5,144,146 | A | 9/1992 | Wekhof | 250/492.1 |
| 5,158,454 | A | 10/1992 | Viebahn et al. | 433/82 |
| 5,169,606 | A | 12/1992 | Batchelor | 422/186.19 |
| 5,178,755 | A | 1/1993 | LaCrosse | 210/195.1 |
| 5,180,499 | A | 1/1993 | Hinson et al. | 210/706 |
| 5,207,993 | A | 5/1993 | Burris | 422/256 |
| 5,213,773 | A | 5/1993 | Burris | 422/256 |
| 5,230,792 | A | 7/1993 | Sauska et al. | 210/97 |
| 5,266,215 | A | 11/1993 | Engelhard | 210/748 |
| 5,288,412 | A | 2/1994 | Voorhees et al. | 210/739 |
| 5,302,298 | A | 4/1994 | Leitzke | 210/748 |
| 5,302,356 | A | 4/1994 | Shadman et al. | 422/186.3 |
| 5,324,423 | A | 6/1994 | Markham | 210/87 |
| 5,352,369 | A | 10/1994 | Heinig, Jr. | 210/760 |
| 5,387,400 | A | 2/1995 | Pelster | 422/186.03 |
| 5,431,861 | A | 7/1995 | Nagahiro et al. | 261/140.1 |
| 5,451,296 | A | 9/1995 | Pikulin et al. | 162/241 |
| 5,520,783 | A | 5/1996 | White et al. | 162/243 |
| 5,536,400 | A | 7/1996 | Schultz | 210/192 |
| 5,540,848 | A | 7/1996 | Engelhard | 210/748 |
| 5,547,590 | A | 8/1996 | Szabo | 210/748 |
| 5,573,733 | A | 11/1996 | Salama | 422/186.18 |
| 5,611,918 | A | 3/1997 | Markham | 210/87 |
| 5,614,151 | A | 3/1997 | LeVay et al. | 422/24 |
| 5,656,242 | A | 8/1997 | Morrow et al. | |
| 5,751,007 | A | 5/1998 | Weaver | 250/504 |
| 5,935,431 | A | 8/1999 | Korin | 210/205 |
| 5,942,196 | A | 8/1999 | Tabata et al. | 422/186.07 |
| 6,136,186 | A | 10/2000 | Gonzalez-Martin et al. | |
| 6,180,014 | B1 | 1/2001 | Salama | 210/748 |
| 6,221,314 | B1 | 4/2001 | Bigelow | 422/24 |
| 6,461,520 | B1 | 10/2002 | Engelhard et al. | 210/748 |
| 6,491,879 | B2 | 12/2002 | Conrad | 422/186.18 |
| 6,511,594 | B2 | 1/2003 | Shaw | 210/120 |
| 6,511,638 | B2 | 1/2003 | Matsuzaki | 422/186.18 |
| 6,602,409 | B1 | 8/2003 | Kuo | 210/192 |
| 6,814,876 | B1 | 11/2004 | Neal | |
| 6,951,633 | B1 | 10/2005 | Barnes | |
| 2003/0201376 | A1 | 10/2003 | Knight et al. | |
| 2004/0036034 | A1 | 2/2004 | Hur et al. | |
| 2005/0092931 | A1 | 5/2005 | Gadgil et al. | |

FOREIGN PATENT DOCUMENTS

| | | |
|---|---|---|
| EP | 0 227 266 | 10/1986 |
| EP | 0 237 793 | 2/1987 |
| EP | 0 316 687 | 11/1988 |
| EP | 0 375 373 | 12/1989 |

* cited by examiner

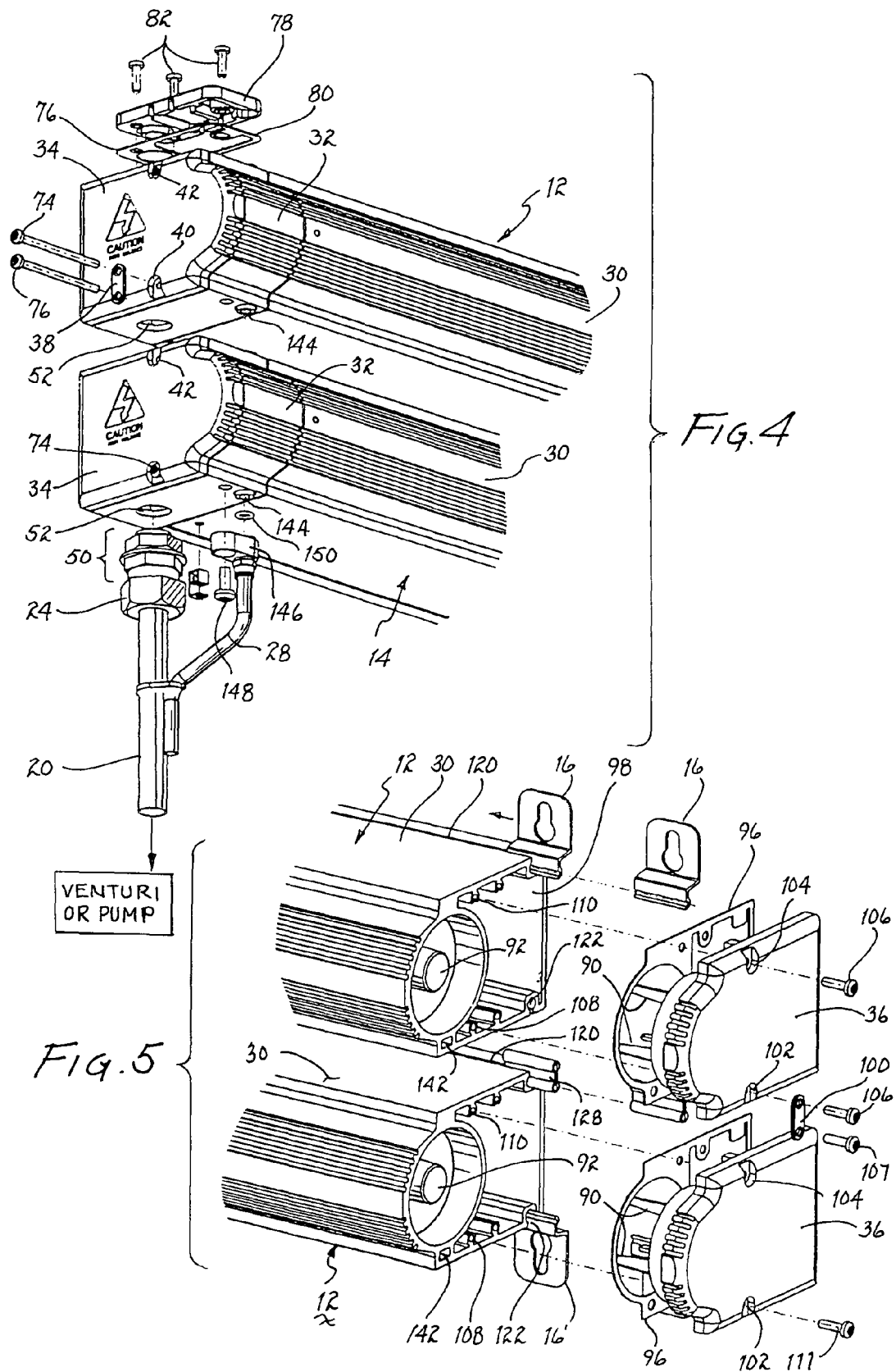

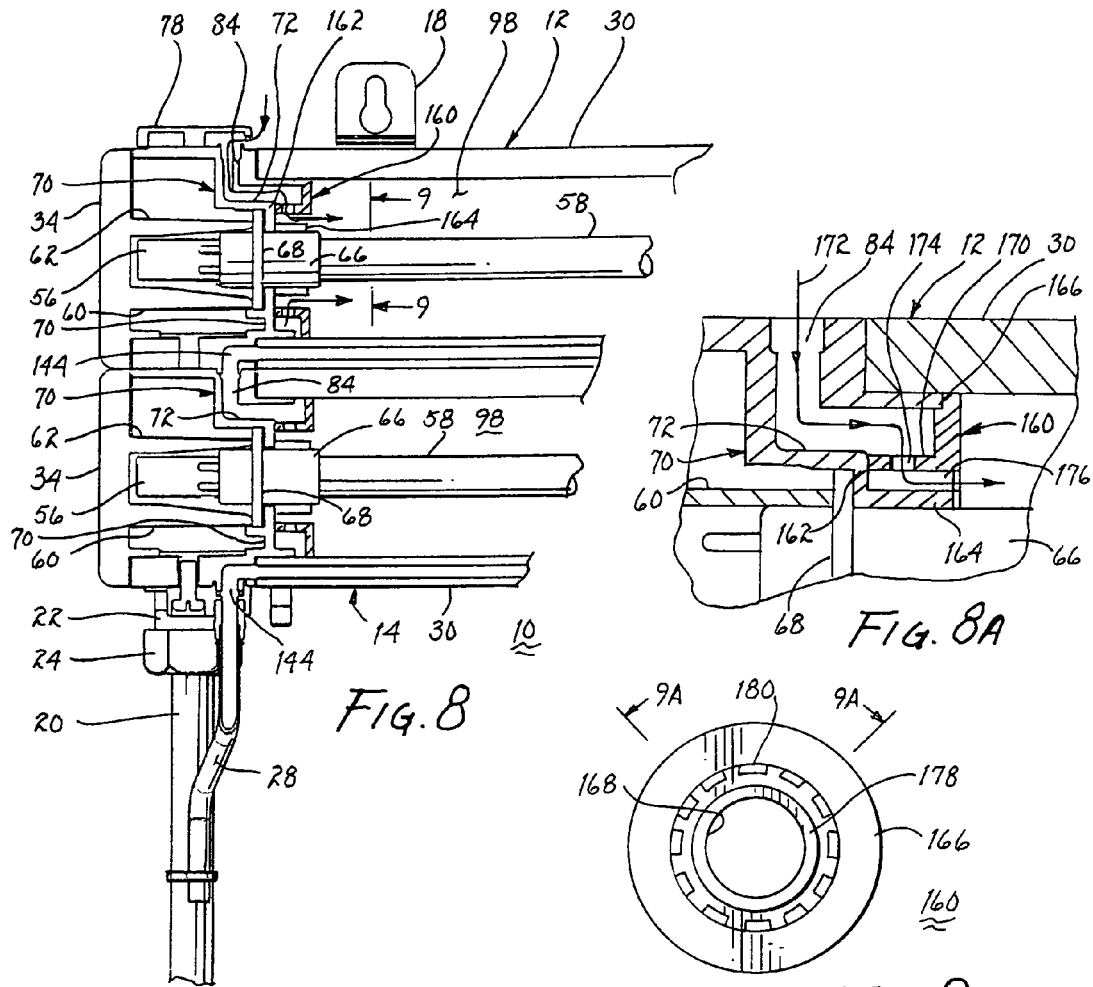
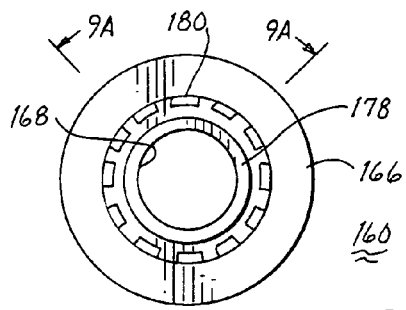
FIG. 8
FIG. 8A
FIG. 9
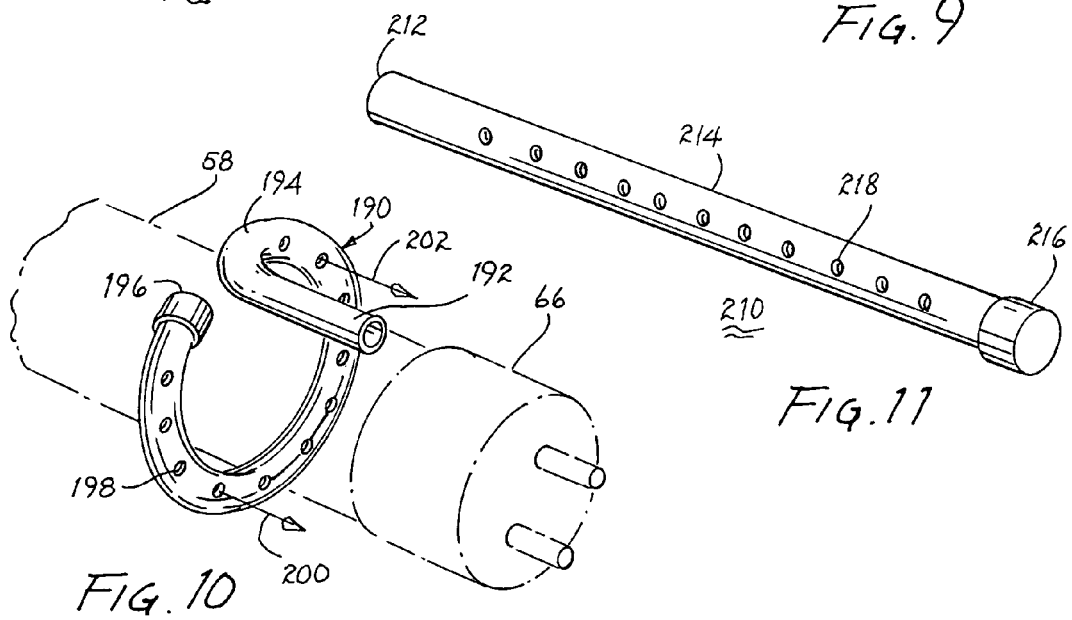
FIG. 10
FIG. 11

MODULAR OZONE GENERATOR WITH AN AIR DIFFUSER

CROSS REFERENCE TO RELATED APPLICATIONS

The present application is a continuation-in-part application of an application entitled "Modular Ozone Generator" assigned Ser. No. 11/029,288, filed Jan. 5, 2005 and assigned to the present assignee.

BACKGROUND OF THE INVENTION

1. Field of the Invention

The present invention relates to ozone generators and, more particularly, to stackable modular ozone generators particularly adapted for use in ozonating the air in the return line of a swimming pool or spa.

2. Description of Related Prior Art

All modern swimming pools and spas include a pump for recirculating the water through a filtration apparatus. The filtration apparatus filters and collects organic and inorganic matter suspended in the water passing through the filter. The micro-organisms that may be part of the organic matter are usually responsible for algae and other organic contaminations of the water in the swimming pool or spa. Conventional treatment procedures include mixing chemicals with the water in the swimming pool or spa to destroy the contaminating micro-organisms. Some of these chemicals may be hazardous to the health of a user of the swimming pool or spa for a period of time until the chemicals have dissipated or otherwise been rendered impotent.

The injection of ozone into water to kill micro-organisms is part of a procedure that has been carried out for decades. Usually, such ozone injection is used in conjunction with waste water treatment plants. Other installations requiring sterile water have also used ozone entraining apparatus in an attempt to destroy any micro-organisms present. There have been some instances of injecting ozone into the return line of swimming pools and spas but for the most part, such installations have not been functionally or practically successful. The main reason for lack of success relates to the low concentration of ozone in the air injected, which required significant amounts of ozone enriched air. Such large amounts of ozone enriched air tended to cause cavitation at the impeller of the pump drawing water through the return line. Additionally, air would tend to collect within the filter and compromise the rate of water flow and the filtration process.

Existing apparatus for injecting ozone enriched air into the return line from a swimming pool or spa tends to be sized as a function of the amount of ozone to be injected per unit of time. To increase the amount of ozone enriched air injected generally required different or larger sized units and hence such replacement incurs a significant cost.

SUMMARY OF THE INVENTION

A modular ozone generator includes a tubular UV lamp disposed within a chamber for emitting radiation in the ultraviolet frequency range to cause conversion of some of the oxygen molecules within the chamber into ozone molecules to produce ozonated air. Air inflows into the chamber through a diffuser having a number of inlets surrounding or adjacent the UV lamp. During irradiation of the oxygen molecules by the UV lamp, the resulting ozone molecules will migrate downwardly within the chamber as the ozone molecules are heavier than the oxygen molecules. This results in a higher concentration of ozone molecules at the bottom of the chamber. To take advantage of the increased concentration of ozone molecules in the air at the lower part of the chamber, an outlet is formed therein. When two or more modules are used, the second module is placed beneath the first module and its inlet is connected with the outlet of the first module. Thereby, the air with the higher concentration of ozone molecules enters the second module and is dispersed about a second UV lamp to generate further ozone molecules. Thereby, the concentration of ozone molecules is further enhanced. Where a yet higher concentration of ozone molecules is desired for a particular application, further modules may be stacked downwardly. Thus, a selected number of modules may be employed at each location of use as a function of the concentration of ozone molecules desired to be entrained within the water to be treated. Each module includes keyways at the top and bottom for slidably receiving tabs to secure the uppermost and lowermost modules to a supporting structure. Keys engage the keyways facing one another between the modules to interconnect adjacent modules. Detachably attached end caps accommodate repair/replacement of elements within a module without requiring dismounting of a module from its support and eliminate detachment of one module from another for such purposes.

It is therefore a primary object of the present invention to provide a diffused flow of air about a UV lamp within an ozone generating module to increase the concentration of ozone molecules relative to the oxygen molecules.

Another object of the present invention is to provide large volume slow moving air about a UV lamp within a module to enhance exposure of oxygen molecules to UV radiation.

Still another object of the present invention is to provide a flow of air about a UV lamp to provide cooling of the UV lamp and enhance the production of ozone molecules.

Yet another object of the present invention is to provide relatively slow moving air about a UV lamp to minimize turbulence of the air flowing about the UV lamp and enhance production of ozone molecules.

A further object of the present invention is to provide relatively low turbulence air flow within an ozone generating module to enhance settling of ozone molecules about the outlet and increase the ratio of ozone molecules to oxygen molecules outflowing from the ozone generator.

A still further object of the present invention is to provide two or more ozone generating modules serially connected to serially irradiate ozonated air flowing into the second and any further serially connected modules.

A yet further object of the present invention is to provide a method for generating ozonated air in a plurality of serially connected ozone generating modules to increase the density of ozone molecules as a function of the number of serially connected ozone generators.

A yet further object of the present invention is to provide a diffuser for diffusing an in flow of air about a UV lamp to enhance production of ozone molecules.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 4 is a partial exploded view showing the inlets and outlets of the respective modules;

FIG. 5 is a partial exploded view illustrating the detachably attached end caps and lamp supporting ribs;

FIG. 8 is a partial cross sectional view illustrating inflow of air or ozonated air through a plurality of apertures disposed about the UV lamp;

FIG. 8A is a detail view of the air inflow shown in FIG. 8;

FIG. 9 is an end view of a diffuser taken along lines 9-9 shown in FIG. 8;

FIG. 10 is a variant air discharge diffuser locatable about a lamp; and

FIG. 11 is a further variant air discharge diffuser locatable along the UV lamp.

DESCRIPTION OF THE PREFERRED EMBODIMENT

Figure 1:
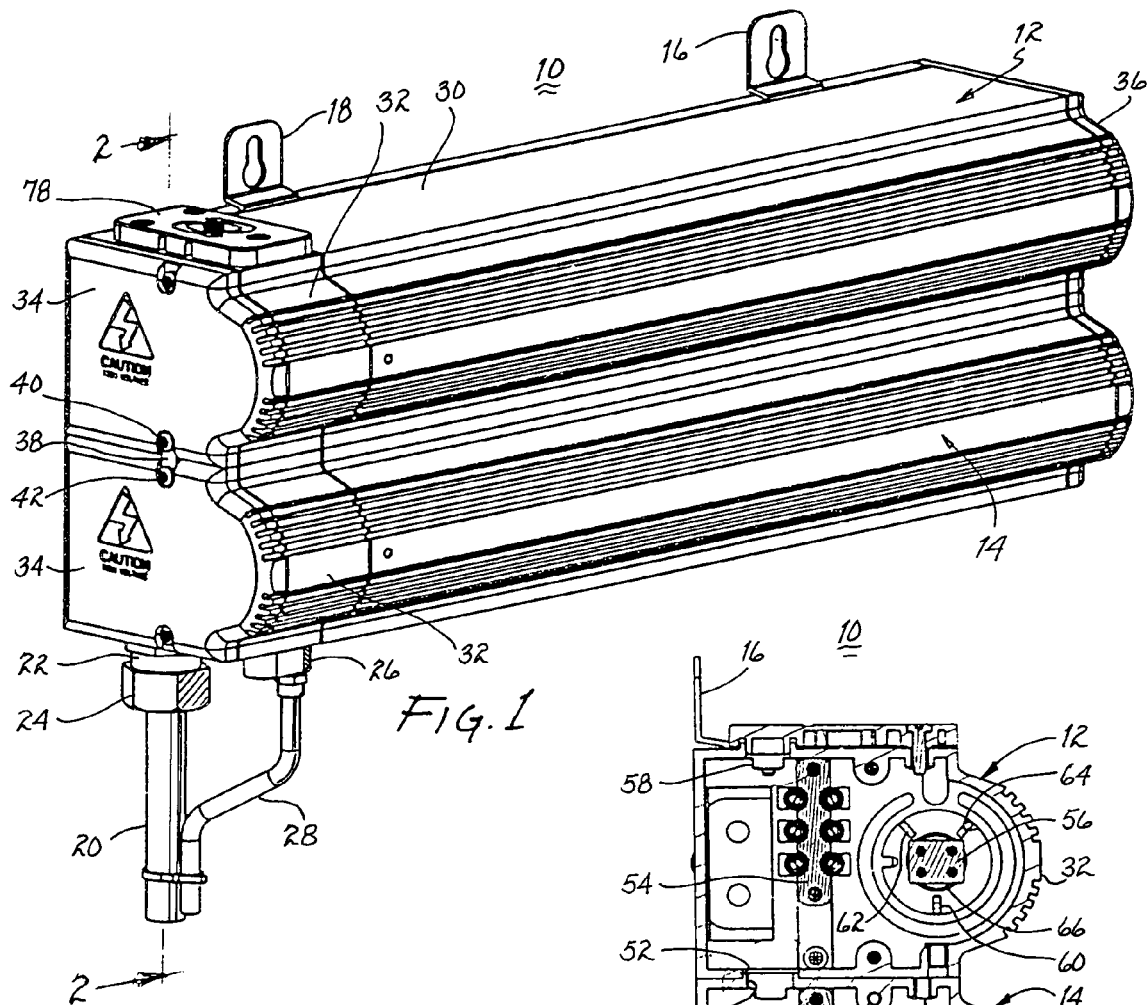
FIG. 1 is an isometric view of a pair of stacked modular ozone generators.

Referring to FIG. 1, there is illustrated an ozone generator 10 formed of a first module 12 and a second module 14. Each of these modules constitutes an ozone generator. Upon actuation, each module will generate ozone enriched air (ozonated air) for discharge at its outlet. By cascading the modules, as illustrated in FIG. 1, the degree of concentration of ozone in the air ultimately discharged from ozone generator 10 will be enhanced. It is to be understood that one or more further modules may be serially connected and extending downwardly.

Each ozone generator 10 is primarily intended for use with a swimming pool or spa. Depending upon the amount of water in the pool or spa, one or more modules (12, 14) may be used to ensure an effective degree of entrainment of the ozone in the water to ensure oxidization of organic material that may be present. In particular, it is intended that the ozone, upon coming in contact with micro-organisms, destroys such micro-organisms.

Figure 3:
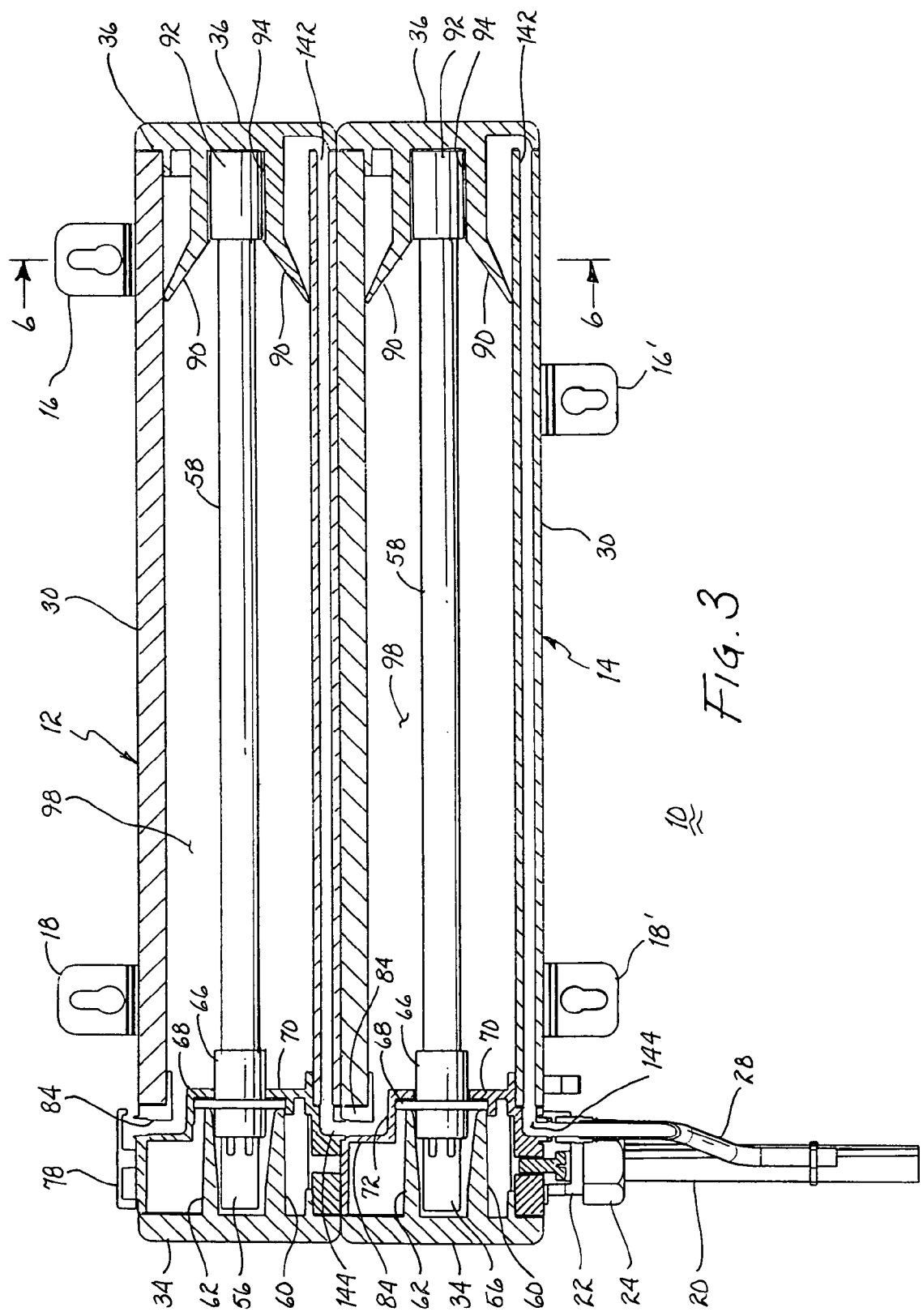
FIG. 3 is a partial cross-sectional view illustrating the mounting of a tubular UV lamp within each module.

Still referring primarily to FIG. 1, an overall description of ozone generator 10 will be provided. A pair of tabs 16, 18 are slidably mounted at the rear of module 12 to permit positioning of the tabs in conformance with hard points of a support or supporting structure. A similar pair of tabs 16' and 18' extend downwardly from the lower-most module (module 14, as shown in FIG. 3). Electrical power to the circuitry and lamps disposed in each of modules 12 and 14 is housed within a conduit 20 secured to a fitting 22 by a nut 24, in accordance with conventional practice. The ozone enriched air is discharged from module 14 through a fitting 26 into a pipe or tube 28.

Each of modules 12 and 14 includes a body 30, which is preferably a hollow aluminum extrusion having a cross-sectional configuration to be described below. A section 32, having the same exterior configuration as body 30, is attached to the body and houses the electrical circuitry for a UV lamp along with a socket for the lamp. Additionally, it includes the channels for channeling a gas, such as air, into body 30 and further channels for channeling the ozone enriched air out of the body. An end cap 34 seals the exposed end of section 32. A further end cap 36 seals the corresponding end of body 30. A strap 38 is lodged within mating depressions 40 at the bottom edge of end cap 34 of module 12 and depression 42 at the upper edge of lower end cap 34 formed as part of module 14. Attachment means, such as screws or bolts 74, 76, extend through apertures in depressions 40, 42 for engagement with body 30 to retain end cap 34 and section 32 attached to the body.

Figure 2:
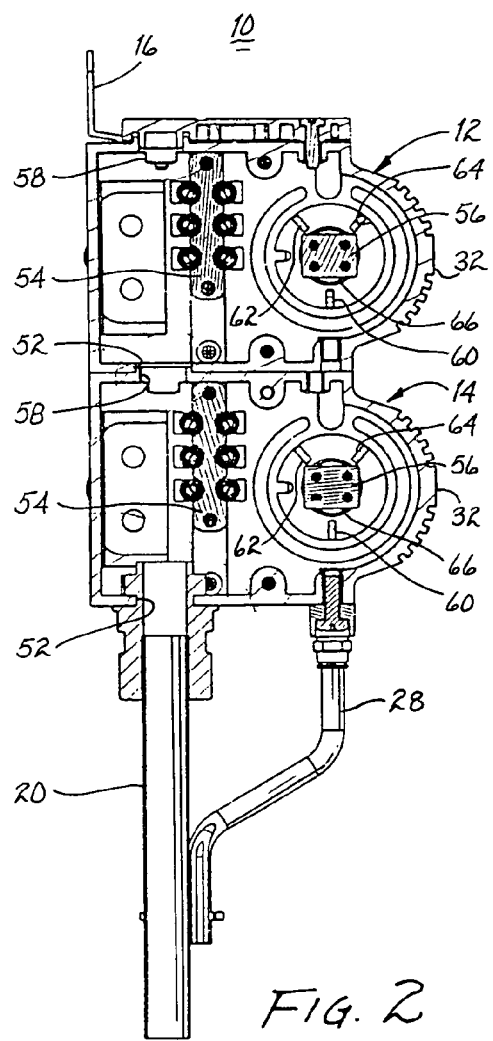
FIG. 2 is a cross-sectional view taken along lines 2-2, as shown in FIG. 1.

Referring jointly to FIGS. 2, 3 and 4, further details will be described. As modules 12 and 14 are essentially identical, common reference numerals will be used for common elements. Fitting 22, in combination with nut 24 and conduit 20 comprise common off-the-shelf fitting assemblies used to interconnect electrical conduit 20 with an aperture 52 at the bottom of section 32 of module 14. Thereby, electrical conductors extend from within conduit 20 to a terminal board 52 within section 32. Further conductors extend from terminal board 52 in section 36 of module 14 to terminal board 54 within section 32 of module 12 through an aperture 58 at the top of the section and aperture 52 in section 32 of module 12. Further electrical conductors extend from each terminal board 54 and are connected to lamp plug 56 in each respective module. Thereby, electrical power is provided to each of lamps 58 particularly shown in FIG. 3.

Each section 32 includes a plurality of inwardly extending radially oriented ribs 60, 62 and 64 for supporting and centrally orienting base 66 of each respective lamp 58. These ribs may be tapered toward the lamp base, as shown in FIG. 3. The base of each lamp includes an annular flange 68 that bears against a wall 70 of section 32 and within a cylindrical section 72 after penetrable insertion of the lamp through an aperture 73 in the wall, which wall serves as a mounting for said lamp. The lamp is retained thereagainst by ribs 60, 62 and 64. Attachment means, such as bolts 74, 76 penetrably engage strap 38 and are in threaded engagement with corresponding channels 108, 110 in body 30 (see FIG. 5). Thereby, the strap serves to tie module 12 with module 14.

Further bolt 76 of module 12 and further bolt 74 of module 14 also engage corresponding channels in body 30 and further secure end caps 34 and sections 32 to their respective body 30. A cover 78 and gasket 80 is secured by a plurality of bolts 82 to section 32 of uppermost module 12. The purpose of this cover is to seal aperture 58 at the top of section 32 of module 12 and to shield but not cover inlet 84 within section 32 (see FIG. 3). Thereby, the interior of section 32 is sealed and water and other foreign matter is discouraged from flowing into inlet 84.

Referring jointly to FIGS. 3 and 5, end cap 36 and its function, as well as its cooperation with the corresponding end of body 30 will be described. The end cap includes a plurality of ribs 90 extending toward body 30 for receiving and guiding end 92 of lamp 58 into a socket 94. Thereby, insertion of a replacement lamp is readily performed by simply removing end cap 34, withdrawing the lamp and inserting a replacement through aperture 73 in wall 70. As end 92 of the lamp approaches end cap 36, it will be guided into its socket and little skill to install the lamp is required by a workman. A gasket 96 is disposed intermediate end cap 36 and body 30 to maintain the integrity of chamber 98 within the body.

Further gaskets provide a seal between end cap 34 and section 32 and between section 32 and body 30. When two or more modules are employed, a mechanical structural interconnection therebetween is provided by a further strap 100 (like strap 38) nesting within depressions 102 and 104 in the respective end caps. Attachment means, such as bolt 106, penetrably engages strap 100 through an aperture extending inwardly from within depression 102 and into threaded engagement with channel 108 formed as part of bodies 30. This same channel is threadedly engaged by bolt 74 extending through end cap 34 and section 32 at the other end of module 12. Similarly, a bolt 107 penetrably engages strap 100 and extends through an aperture formed as part of depression 104 into threaded engagement with a channel 110 disposed in body 30 of module 12. This same channel is engaged by bolt 76 extending through end cap 34 and section 32 at the other end of the module 14. A further bolt 109 penetrably engages depression 104 and the aperture therein at the upper edge of end cap 36 corresponding with module 12 into threaded engagement with channel 110. This channel is similarly engaged by a bolt 74 extending through end plate 34 and section 32 at the other end of module 12. This same channel is engaged by bolt 76 extending through end cap 34 and section 32 at the other end of module 12. A yet further bolt 112 penetrably engages depression 102 and the aperture therein at the lower edge of end plate 36 corresponding with module 14 into threaded engagement with channel 108. This same channel is engaged by bolt 74 extending through end cap 34 and section 32 at the other end of module 14.

Referring jointly to FIGS. 3, 5, 6 and 7, further interconnections between adjacent modules will be described along with further details attendant mounting of the module or a set of modules to a support or supporting surface. A keyway 120 extends along the top rear edge of body 30. A similar keyway 122 extends along the bottom rear edge of the body. Tab 16 includes an apertured flat segment 124 for penetrably receiving attachment means, such as a screw, bolt, nail, or the like, for securing the tab and the supported module to a supporting surface. The lower end of tab 16 includes a bulbous segment 126 slidably disposed within keyway 120. This bulbous segment may be a partial circular segment bent from a part of a sheet of material forming tab 16, as illustrated. Thereby, the tab may be slidably moved along keyway 120 to position it in correspondence with a hard point of the supporting surface. A key 128, shaped in the manner of a dog bone in cross section, includes opposed bulbous ends 130, 132 for slidable engagement within keyway 130 in module 12 and keyway 120 in module 14. The distance between the bulbous ends is configured to ensure that module 14 is captured adjacent to and in contacting relationship with module 12. Thereby, key 128 (or keys 128), in combination with straps 38, 100 (see FIGS. 4 and 5) provide a mechanical interconnection between modules 12 and 14 to maintain the modules adjacent one another to form a unitary structure. It may be noted that bulbous ends 130, 132 of key 128 are shown as cylindrical elements and may be an aluminum extrusion. Alternatively, the bulbous ends may be solid.

Figure 6:
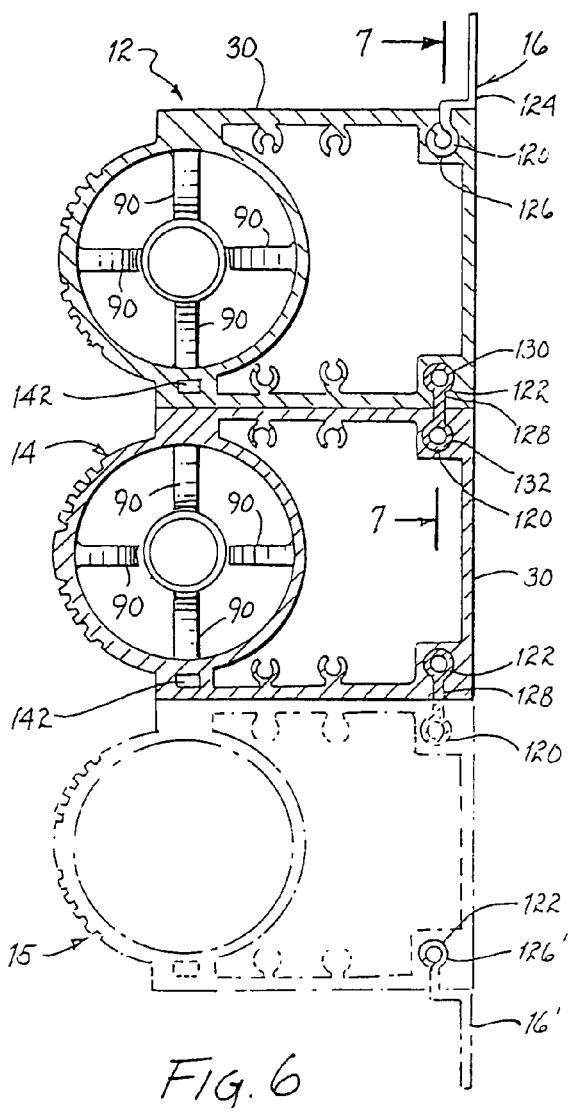
FIG. 6 is a cross-sectional view taken along line 6-6, as shown in FIG. 3.
Figure 7:
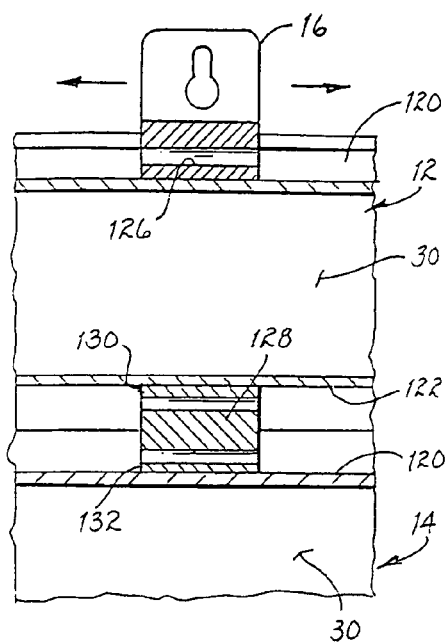
FIG. 7 is a cross-sectional view taken along line 7-7, as shown in FIG. 6.
Figure 9B:
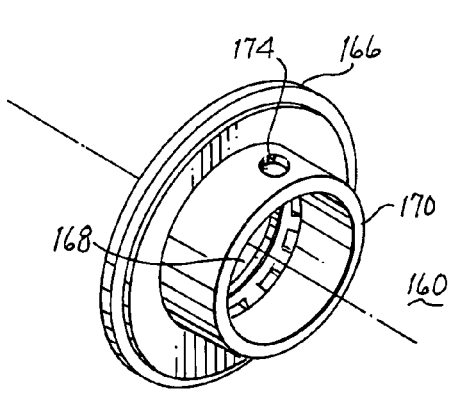
FIG. 9B illustrates a reverse view of the diffuser shown in FIG. 9.
Figure 9A:
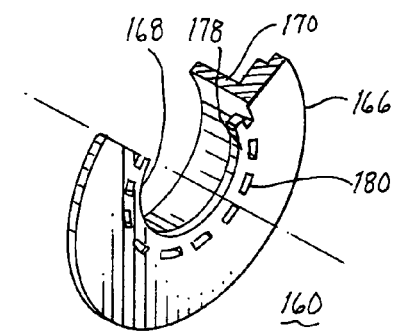
FIG. 9A is a partial cross sectional view taken along lines 9A-9A shown in FIG. 9.

FIG. 6 illustrates a yet further module 15 identical with modules 12 and 14. The purpose of this illustration, in dashed lines, is that of representing further and possibly multiple modules identical with modules 12 and 14 and stacked therebelow. As each module not only produces additional ozone molecules but also increases the concentration of ozone molecules within the air, the number of modules employed would be a function of not only the amount of water to be ozonated but the flow rate and entrainment rate of the ozone molecules in the water.

FIG. 6, as well as FIG. 3, also illustrate further tabs 16' and 18' which are identical with tabs 16 and 18. Bulbous segment 126' of each of tabs 16' and 18' slidably engages keyway 122 in module 15. Obviously, if only module 12 or only modules 12 and 14 were employed, tabs 16' and 18' would engage the keyway 122 of the lowermost module.

Referring primarily to FIGS. 3 and 4, the step of ozone generation and the steps of conveying the ozonated air through and discharge it from ozone generator 10 will be described. Air is drawn in through inlet 84 of module 12 into chamber 98 of module 12. The air within the chamber is irradiated by ultraviolet (UV) light emanating from lamp 58. Such irradiation will convert some of the oxygen molecules into ozone molecules. As particularly shown in FIG. 3, inlet 84, shielded by cover 78, is formed within section 32. The flow of air within chamber 98 from the inlet traverses the length of lamp 58 to expose the flowing air to the full length of the lamp and thereby increase the creation of ozone molecules. At the far end of the module, the air flows intermediate ribs 90 and into a passageway 142 extending the length of body 30 beneath chamber 98. The ozonated air flows from passageway 142 into section 32 wherein it is directed downwardly through an outlet 144 in an upper section 32 and into an inlet 84 of a lower section 32; O-rings or the like are used to seal the junction between the outlets and the inlets to prevent escape of any ozonated air. It is noted that inlet 84 of module 12 is identical with inlet 84 of module 14. The air is directed from inlet 84 of module 14 into chamber 98 of the module. This air includes ozone molecules created in module 12. Further exposure to lamp 58 in module 14 will produce further conversion of oxygen molecules into ozone molecules. Again, the ozone enriched air within module 14 will flow along lamp 58 into passageway 142 of module 14. The ozone enriched air in channel 142 of module 14 is exhausted through outlet 144 in module 14.

As particularly shown in FIG. 4, a fitting 146 is secured to section 32 with a bolt 148. The purpose of fitting 146 is that of interconnecting tube 28 with outlet 144 at the bottom of section 32 of module 14. An O-ring 150 is disposed between fitting 146 and section 32 to ensure a leak free interconnection between tube 28 and outlet 144. It is to be noted that further O-rings 150 or similar sealing members may be disposed between the outlet of one module and the inlet of an adjacent module to provide a leak free interconnection.

Ozone molecules are more dense and hence heavier than oxygen molecules. This physical attribute of these molecules is purposely used in the present invention to increase the concentration of ozone molecules in the ozone enriched air discharged from each module and from a set of modules forming the ozone generator. More specifically, the ozone molecules created within module 12 will tend to migrate downwardly within chamber 98. Thus, the downward migration and hence concentration of ozone molecules at the bottom of the chamber will be greater than at a height upwardly therefrom. This greater concentration of ozone molecules will flow into passageway 142 and be discharged into chamber 98 of module 14. Again, the ozone molecules entering chamber 98 of module 14 and the further ozone molecules created therein will migrate downwardly to increase the concentration at the bottom of chamber 98 in module 14. Thereby, the concentration of ozone molecules in the air flowing into passageway 142 of module 14 and into tube 28 will be enhanced.

The flow of air through ozone generator 10, whether formed of a single module or of a multiple stacked molecules to provide a cascade-like creation of ozone molecules, may be introduced into the water by a venturi-like device 152 (see FIG. 4) having water flowing therethrough to create a low pressure environment to draw the ozone enriched air into entrainment in the water. This technology is well known. Alternatively, a pump 152 may be used to draw air through the ozone generator and entrain it within water through a sparger or the like.

In the event of the air flow around and about the UV lamp in the first module or the flow of ozonated air in the second or subsequent modules does not produce a cooling function for the UV lamp, it may overheat. Such overheating reduces the production of ozone molecules. In the event the airflow or flow of ozonated air into the module is restricted, the production of ozone molecules is reduced. In the event of significant flow of air or ozonated air across a UV lamp, turbulence about the lamp occurs and the rapidly moving air or ozonated air across the UV lamp will reduce exposure to the UV radiation and thereby decrease the production of ozone molecules. Furthermore, the turbulence created may impede settling of the ozonated air proximate the outlet of a module. To overcome these detriments to production of ozone molecules, it would be beneficial to have a relatively large volume of slow moving air/ozonated air flow past the UV lamp. Moreover, dispersing the inflowing air/ozonated air about or along the UV lamp will have a beneficial effect resulting from irradiation by the UV lamp. Finally, with the air/ozonated air moving relatively slowly, the heavier ozonated molecules are more likely to settle proximate the outlet and thereby increase the concentration of the ozone molecules in the outflow through the outlet of the module.

Referring to FIG. 8, there is shown the left end of modules 12 and 14, as more fully shown in FIG. 3. Common elements have been assigned common reference numerals. Instead of having the air enter module 12 or the ozonated air enter module 14 through a single aperture, a diffuser is used to translate the inflowing air/oxygenated air into a plurality of streams generally encircling UV lamp 58 within each respective module. The diffuser will be discussed in further detail with joint reference to FIGS. 8A, 9, 9A and 9B. Wall 70 includes a cylindrical section 72 extending about annular flange 66 of lamp 58. The annular flange abuts against an annular wall 162 extending radially inwardly from the cylindrical section into circumferential contact with base 68 of the lamp. A further cylindrical section 164 extends from the annular wall and encircles base 66 of the UV lamp. Perimeter 166 of diffuser 160 abuts and is supported by the inner wall of body 30. Internal perimeter 168 of the diffuser abuts the end of further cylindrical section 164 and generally encircles base 66 of the UV lamp.

Further details of the diffuser will be described with primary reference to FIGS. 8A, 9, 9A and 9B. Diffuser 160 includes a cylinder 170 abutting annular wall 162. As described previously, inlet 84 accommodates an inflow of air, as represented by arrow 172. The air flows through aperture 174 in cylinder 170 into a plenum 176 defined by further cylindrical section 164, annular wall 162, cylinder 170 and an annular flange 178 terminated by internal perimeter 168. A plurality of apertures 180 extend through flange 178 and provide fluid communication with the interior of plenum 176. Accordingly, an air flow, as represented by arrow 172, flows into inlet 184, through aperture 174 and into plenum 176. The air is exhausted from the plenum through each of the plurality of apertures 180. As particularly noted in FIG. 9, these apertures generally extend about base 66 of the UV lamp. Thereby, the UV lamp is ultimately washed by the plurality of streams of air exiting from apertures 180.

Preferably, the sum of the areas of apertures 180 is significantly greater than the cross sectional area of inlet 84. Thereby, the flow of volume through inlet 84 and apertures 180 remains constant but the velocity of flow from the apertures is significantly reduced. The reduced airflow velocity will provide a sufficiently slow rate of advancement of air through module 12 to enhance the number of oxygen molecules irradiated by the UV lamp and resulting in an increase in density of the ozone molecules relative to the oxygen molecules in the air. Additionally, the airflow about the UV lamp will tend to draw off excess heat and thereby enhance the production of ozone molecules. Because of the relatively low velocity of air flow through module 12, the degree of air turbulence within the module is low and ozone molecules have a greater opportunity to migrate and collect in and about the outlet of the module to enhance the concentration of ozone molecules exiting from module 12 and subsequently introduced to module 14 as described above.

Module 14, disposed below module 12, as described above, also includes a diffuser 160 to disperse the ozonated air flowing into module 14 about its UV lamp at a relatively low velocity. As discussed above, the air entering module 14 is ozonated air and this ozonated air is further irradiated by the UV lamp within module 14 to increase the density of ozone molecules relative to the oxygen molecules in the air.

Referring to FIG. 10, there is illustrated a first variant diffuser 190 encircling a UV lamp 58 extending from a base 66. It includes a tube 192 to be placed in fluid communication with inlet 84 of module 12. Thereby, a flow of air enters the first variant diffuser. Tube 192 is in fluid communication with a hollow ring 194 partially encircling UV lamp 58. A cap 196 seals the end of the ring. A plurality of apertures 198 are formed in ring 194. The total area of the apertures is preferably greater than the cross sectional area of inlet 84 to provide the same volume of air flow therefrom but at a lower velocity than the air flow velocity associated with inlet 84. The apertures exhaust the air flowing into tube 192, as depicted by arrows 200, 202. In the preferred embodiment, the outflow of air from apertures 198 is toward base 66 in order to enhance mixing with air existing within module 12 and requiring a reverse in direction of flow toward the outlet of the module. This will slow down the airflow velocity and yet there will be significant volumetric airflow. For reasons set forth above, the resulting airflow will have a cooling effect upon the UV lamp, minimize turbulence to enhance pooling of ozone molecules at the outlet and enhance irradiation of oxygen molecules flowing past the UV lamp.

A second variant diffuser 210 is shown in FIG. 11. It includes an inlet 212 placed in fluid communication with inlet 84 of module 12. This second variant diffuser is essentially an elongated tube 214 having a cap 216 to seal the end opposite from the inlet. A plurality of apertures 218 are disposed along the tube to exhaust the air inflowing to the tube along a UV lamp. The resulting airflow from second variant diffuser 210 will have the same beneficial effects as diffuser 160 and first variant diffuser 190.

In the above discussion of the first and second variant diffusers shown in FIGS. 10 and 11, respectively, reference has been primarily made to module 12. It is to be understood that either of these diffusers may be located in module 14 since modules 12 and 14 are essentially identical in structure. Were either of the first or second variant diffusers disposed in module 14 or subsequently mounted modules, the air flowing thereinto would be oxygenated air, as described above. As set forth in detail above, each subsequent module would increase the concentration of ozone molecules to air molecules in the air outflowing therefrom.

We claim:

1. An ozone generator for providing ozone enriched air, said ozone generator comprising in combination:
   a) a body defining a chamber for air flow therethrough;
   b) an ultraviolet lamp disposed in said chamber for irradiating the air passing through said chamber to convert oxygen molecules to ozone molecules, the ultraviolet lamp comprising a first end and a second end;

c) an air inlet on an upper side of the body for introducing air;
d) a diffuser for diffusing the introduced air about said lamp, said diffuser having a diffuser inlet coupled to the air inlet, the diffuser inlet in fluid communication with a continuous cylindrical cavity encircling at least a first portion of the first end of the ultraviolet lamp, the cylindrical cavity being surrounded by a cylindrical portion encircling an annular flange which extends inwardly therefrom and encircles at least a second portion of the first end of the ultraviolet lamp, the annular flange comprising a plurality of apertures extending therethrough from the cylindrical cavity to an outer surface of the diffuser, the plurality of apertures being spaced around the annular flange such that air introduced into the diffuser through the diffuser inlet is dispersed into the chamber through the plurality of apertures encircling the first end of ultraviolet lamp; and
e) an air outlet on a lower side of the body for discharging ozone enriched air, the air outlet in fluid communication with an opening in the chamber near the second end of the ultraviolet lamp.

2. The ozone generator as set forth in claim 1 wherein said diffuser is at one end of said chamber and including a passageway disposed within said body for conveying the ozone enriched air from the other end of said chamber to said outlet.

3. The ozone generator as set forth in claim 1 wherein said lamp is tubular and wherein said diffuser is disposed about one end of said lamp.

4. The ozone generator as set forth in claim 1 wherein said diffuser includes a plenum for receiving the introduced air, wherein the plurality of apertures is in fluid communication with said plenum and disposed about said lamp for discharging air from said plenum.

5. The ozone generator as set forth in claim 4 wherein the area across the totality of said apertures is greater than the area across said inlet.

6. The ozone generator as set forth in claim 4 wherein each of said apertures is an elongated slot.

7. The ozone generator as set forth in claim 1 wherein said inlet is at the upper end of said chamber and said outlet is in communication with the lower end of said chamber.

8. The ozone generator as set forth in claim 1 wherein said diffuser includes a tube in fluid communication with said inlet and a hollow ring extending at least partly about said lamp, said ring including a plurality of apertures for discharging the introduced air about said lamp.

9. The ozone generator as set forth in claim 8 wherein the area of said apertures is greater than the area of said inlet.

10. The ozone generator as set forth in claim 8 wherein said apertures are oriented away from said outlet.

11. The ozone generator as set forth in claim 1 wherein said diffuser includes an elongated straight tube in fluid communication with said inlet and a plurality of apertures disposed along said tube for discharging the introduced air along said lamp.

12. The ozone generator as set forth in claim 11 wherein the area of said apertures is greater than the area of said inlet.

13. An ozone generator formed of interconnected stacked ozone generating modules, each module comprising in combination:
a) a body, a section disposed at one end of said body, a first end cap secured to said section, and a second end cap secured to the other end of said body, said section and said first and second end caps defining a chamber within said module;
b) an ultraviolet lamp disposed within said chamber for converting oxygen molecules into ozone molecules, the ultraviolet lamp comprising a first end and a second end;
c) an air inlet for introducing air into said chamber;
d) a diffuser for diffusing the introduced air adjacent said lamp, said diffuser having a diffuser inlet coupled to the air inlet in fluid communication with a cavity encircling at least a first portion of the first end of the ultraviolet lamp, the cavity being surrounded by a portion encircling an annular flange that extends inwardly and encircles at least a second portion of the first end of the ultraviolet lamp, that annular flange having plurality of apertures therein that disperse air into the chamber;
e) an outlet for discharging ozone enriched air from said chamber, said outlet of an upper one of said modules being in fluid communication with said inlet of an adjacent lower one of said modules; and
f) a tube extending from said outlet of the lowermost one of said modules to a point of use of the ozone enriched air.

14. The module as set forth in claim 13 wherein said lamp is a tubular lamp and wherein said diffuser is disposed proximate one end of said lamp and including a passageway disposed in said body for conveying ozone enriched air from proximate the other end of said lamp to said outlet.

15. The module as set forth in claim 13 wherein said diffuser includes a plenum for receiving the introduced air, wherein the plurality of apertures is in fluid communication with said plenum and disposed about said lamp for discharging air from said plenum.

16. The module as set forth in claim 15 wherein the area of said apertures is greater than the area of said inlet.

17. The module as set forth in claim 15 wherein each of said apertures is an elongated slot.

18. The module as set forth in claim 13 wherein said diffuser includes a tube in fluid communication with said inlet and a hollow ring extending at least partly about said lamp, said ring including a plurality of apertures for discharging the introduced air about said lamp.

19. The module as set forth in claim 18 wherein the area of said apertures is greater than the area of said inlet.

20. The module as set forth in claim 18 wherein said apertures are oriented away from the main part of said chamber.

21. The module as set forth in claim 13 wherein said diffuser includes an elongated straight tube in fluid communication with said inlet and a plurality of apertures disposed along said tube for discharging the introduced air along said lamp.

22. The module as set forth in claim 21 wherein the area of said apertures is greater than the area of said inlet.

* * * * *